(12) United States Patent
Cabrera et al.

(10) Patent No.: US 9,444,679 B2
(45) Date of Patent: Sep. 13, 2016

(54) WIRELESS COMMUNICATION NETWORK BEARER MANAGEMENT

(71) Applicant: Telefonaktiebolaget LM Ericsson (publ), Stockholm (SE)

(72) Inventors: Ricardo Paredes Cabrera, Ottawa (CA); Vijayashree Sundaram, Ottawa (CA); Jianning Liu, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 77 days.

(21) Appl. No.: 14/368,905

(22) PCT Filed: Jun. 16, 2014

(86) PCT No.: PCT/IB2014/062276
§ 371 (c)(1),
(2) Date: Jun. 26, 2014

(87) PCT Pub. No.: WO2015/193699
PCT Pub. Date: Dec. 23, 2015

(65) Prior Publication Data
US 2015/0365273 A1 Dec. 17, 2015

(51) Int. Cl.
*H04Q 7/00* (2006.01)
*H04L 12/24* (2006.01)
*H04W 28/02* (2009.01)
*H04W 76/02* (2009.01)
*H04W 88/08* (2009.01)

(52) U.S. Cl.
CPC .......... *H04L 41/08* (2013.01); *H04W 28/0268* (2013.01); *H04W 76/02* (2013.01); *H04W 76/025* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 8,649,348 B2 | 2/2014 | Huang et al. | |
| 8,989,124 B1* | 3/2015 | Ramamurthy | H04W 76/022 370/329 |
| 2007/0253365 A1 | 11/2007 | Hedberg et al. | |
| 2011/0195716 A1 | 8/2011 | Hapsari et al. | |
| 2013/0272121 A1* | 10/2013 | Stanwood | H04L 47/2475 370/230 |
| 2014/0162637 A1* | 6/2014 | Park | H04W 8/005 455/434 |
| 2014/0206361 A1* | 7/2014 | Centonza | H04W 76/045 455/444 |
| 2014/0355439 A1* | 12/2014 | Kakadia | H04L 47/522 370/235 |
| 2015/0271706 A1* | 9/2015 | Baboescu | H04W 28/085 370/235 |

FOREIGN PATENT DOCUMENTS

| | | |
|---|---|---|
| EP | 2 693 800 A1 | 2/2014 |
| WO | 2014036326 A2 | 3/2014 |

OTHER PUBLICATIONS www.netmanias Technical Documents LTE QoS SDF and EPS Bearer Q dated Sep. 11, 2013 [downloaded from the Internet May 22, 2014] (11-pages).

(Continued)

*Primary Examiner* — Duc C Ho
(74) *Attorney, Agent, or Firm* — Christopher & Weisberg, P.A.

(57) ABSTRACT

A method and system for configuring a service at a base station of a wireless communication network are disclosed. According to one aspect, a base station receives from a network node a service identifier that identifies a service to be provided via a plurality of bearers to a user equipment. The base station configures the plurality of bearers according to a service configuration associated with the service identifier.

27 Claims, 5 Drawing Sheets

(56) References Cited

OTHER PUBLICATIONS

3GPP TS 36.331 V12.1.0 (Mar. 2014) 3rd Generation Partnership Project; Technical Specification Group Radio Access Network; Evolved Universal Terrestrial Radio Access (E-UTRA); Radio Resource Control (RRC); Protocol specification (Release 12) Mar. 2014 consisting of 356-pages.

3GPP TS 36.413 V12.1.0 (Mar. 2014) 3rd Generation Partnership Project; Technical Specification Group Radio Access Network; Evolved Universal Terrestrial Radio Access Network (E-UTRAN); S1 Application Protocol (S1AP) (Release 12) Mar. 2014 consisting of 285-pages.

International Search Report and Written Opinion dated Feb. 20, 2015 for International Application Serial No. PCT/PCT/IB2014/062276, International Filing Date Jun. 16, 2014 consisting of 11-pages.

Written Opinion of the International Preliminary Examining Authority dated May 6, 2016 for International Application PCT/PCT/IB2014/062276, International Filing Date Jun. 16, 2014 consisiting of 6-pages.

* cited by examiner

WIRELESS COMMUNICATION NETWORK BEARER MANAGEMENT

FIELD

The present invention relates to a method and system for configuring radio bearers in a wireless communication system, and in particular, configuring radio bearers associated with a particular service.

BACKGROUND

In a wireless communication system, such as a long term evolution (LTE) communication system, services are provided to a subscriber on radio bearers. Radio bearers are channels that carry audio, video, data, and/or control signaling between a network node, such as a mobile management entity (MME), and a base station or between a base station and a user equipment (UE) of a subscriber. For example, voice packets of a voice-only service between a landline caller and a wireless subscriber are carried by an uplink bearer carrying voice packets and overhead from the UE of the wireless subscriber to the base station and a downlink bearer carrying voice packets and overhead from the base station to the wireless subscriber. Also, a transport bearer carries voice and overhead from the base station to a network node that is connected to the public switched telephone network (PSTN) or backhaul network and another transport bearer carries voice and overhead from the network node to the base station.

Some services, such as video and voice over Internet protocol (VoIP) or voice over LTE (VoLTE) require at least two bearers in each direction, one for carrying voice and one for call signaling. For such services, a first downlink bearer carries voice from the serving base station to the UE and a second downlink bearer carries signaling from the serving base station to the UE. Similarly, a first uplink bearer carries voice from the UE to the serving base station and a second uplink bearer carries signaling from the UE to the serving base station. Further, four transport bearers carry voice and signaling between the base station and the network node.

The base station and network nodes currently use the bearer as the level of granularity to manage connections. This means that if a bearer associated with a service fails, the remaining bearers associated with the service continue to be reserved for the service, thereby unnecessarily tying up resources. Further, quality of service (QoS) bandwidth and bit rates are specified for each bearer independently, without regard to the particular needs of the service as a whole. Admission control is also performed at the bearer level. Thus, for example, one bearer of a service may be admitted while others are not, thereby preventing the service from being established correctly.

SUMMARY

The present invention advantageously provides a method and system for configuring a service at a base station of a wireless communication network. According to one aspect, a base station receives from a network node a service identifier that identifies a service to be provided via a plurality of bearers to a user equipment. The base station configures the plurality of bearers according to a service configuration associated with the service identifier.

According to this aspect, in some embodiments, receiving the service identifier includes receiving a plurality of Radio Access Bearer (RAB) messages, each RAB message being associated with a respective one of the plurality of bearers and including the service identifier. In some embodiments, each of the plurality of RAB messages is one of an E-RAB Setup message, an E-RAB Modify message and an Initial Context Setup Message. In some embodiments, the received service identifier is received in an S1AP message having a plurality of bearers associated with the service identifier, the S1AP message being one of an E-Service Setup message, an E-Service Modify message and an E-Service Release message.

In some embodiments, the method further includes receiving the service configuration from the network node. In some embodiments, the service configuration is stored at the base station. In some embodiments, the method further includes at least one of establishing, modifying and releasing one of the plurality of bearers. In some embodiments, the method further includes adapting a bit rate for each of the plurality of bearers. In some embodiments, the service configuration includes one of at least one service configuration parameter and at least one bearer configuration parameter for each of the plurality of bearers. In some embodiments, a least one bearer configuration parameter includes one of a video resolution, a frame rate and a codec. In some embodiments, the codec is one of an adaptive multi-rate codec, a video Motion Picture Experts Group (MPEG) codec at a specified frame rate and an audio codec. In some embodiments, the service is one of a voice over long term evolution (VoLTE) service, an Internet Protocol Multimedia Subsystem (IMS) video service, a voice over Internet (VoIP) best effort service, and a video best effort service. In some embodiments, the network node is a mobile management entity, MME.

According to another aspect, the invention provides a base station that configures bearers associated with a service. The base station includes a receiver, a memory and a processor. The receiver is configured to receive a service identifier that identifies a service to be provided to a user equipment (UE). The memory is configured to store the received service identifier. The processor is in communication with the memory and is configured to associate a plurality of bearers with the identified service, and to configure the plurality of bearers according to the identified service.

According to this aspect, in some embodiments, the configuration of the plurality of bearers specifies, for each bearer, at least one of a video resolution, a frame rate and a codec. In some embodiments, the service identifier is received in a radio access bearer (RAB) message associated with one of the plurality of bearers. In some embodiments, the service identifier is received in an S1AP message.

According to yet another aspect, the invention provides a method of configuring a service at a base station of a wireless communication network. The method includes receiving a first message associated with a first bearer, the first message containing a first quality of service class identifier (QCI) and receiving a second message associated with a second bearer, the second message containing a second quality of service class identifier (QCI). The method further includes determining a service identifier based on at least one of the first and second QCIs. The method also includes configuring at the base station the first and second bearers according to a service configuration associated with the service identifier.

According to this aspect, in some embodiments, the service configuration is stored at the base station. In some embodiments, the method further includes at least one of establishing, modifying and releasing one of the first and second bearers. In some embodiments, the method further includes adapting a bit rate for each of the first and second bearers. In some embodiments, the service configuration includes one of at least one service configuration parameter and at least one bearer configuration parameter for each of the plurality of bearers. In some embodiments, the at least one bearer configuration parameter comprises one of a video resolution, a frame rate and a codec.

According to yet another aspect, the invention provides a base station having a receiver, a memory and a processor. The receiver is configured to receive a request for one of a plurality of services and at least one quality of service class identifier (QCI) corresponding to the requested service. The memory is configured to store a table mapping QCIs to corresponding service identifiers, and service configuration parameters. The processor is in communication with the memory and is configured to determine a service identifier using the at least one received QCI, and to identify a set of service configuration parameters associated with the service identifier.

According to this aspect, the set of service configuration parameters are associated with a plurality of bearers, the configuration parameters identifying at least one of a video resolution, a frame rate and a codec for each of the plurality of bearers.

According to another aspect, the invention provides a base station having a receiver module, a memory module and a processor module. The receiver module is configured to receive a service identifier that identifies a service to be provided to a user equipment, UE. The memory module is configured to store the received service identifier. The processor module is in communication with the memory and is configured to associate a plurality of bearers with the identified service, and to configure the plurality of bearers according to the identified service.

According to yet another aspect, the invention provides a base station having a receiver module, a memory module and a processor module. The receiver module is configured to receive a request for one of a plurality of services and at least one quality of service class identifier, QCI, corresponding to the requested service. The memory module is configured to store a table mapping QCIs to corresponding service identifiers and to store service configuration parameters. The processor module is in communication with the memory and is configured to determine a service identifier using the at least one received QCI, and to identify a set of service configuration parameters associated with the service identifier.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
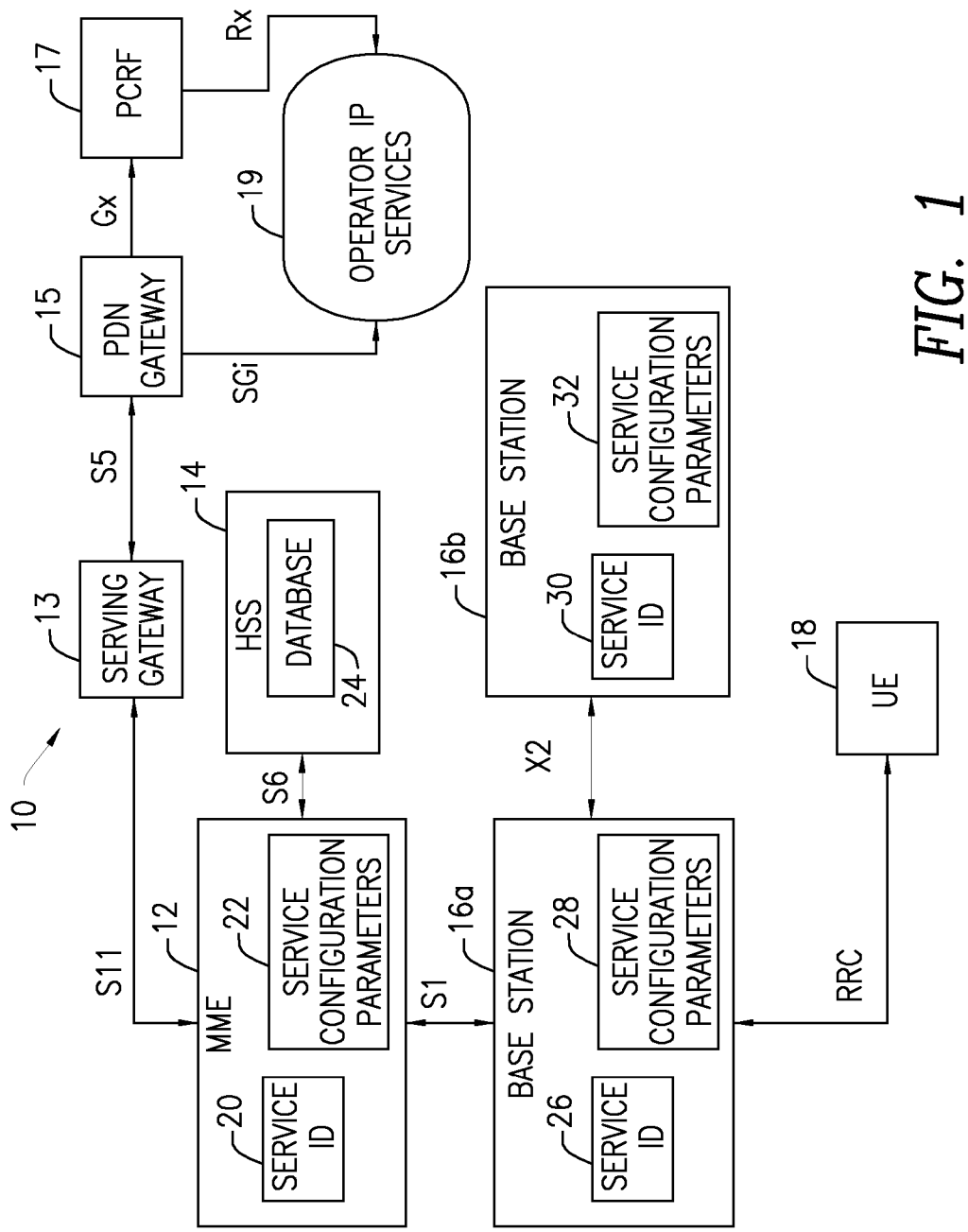
FIG. 1 is a block diagram of a portion of a wireless communication network constructed in accordance with principles of the present invention.

Before describing in detail exemplary embodiments that are in accordance with the present invention, it is noted that the embodiments reside primarily in combinations of apparatus components and processing steps related to configuring bearers in support of a service in a wireless communication system. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Embodiments described herein provide for configuring a plurality of bearers associated with a service that is identified by a service identifier. In some embodiments, the service identifier is sent from a network node, such as an MME, to a base station, such as a long term evolution (LTE) eNode B (eNB). The base station looks up the received service identifier from a table stored at the base station. The service identifier is associated in the table with a set of configuration parameters for the plurality of bearers associated with the service. Some or all of these bearers may be bidirectional, being implemented in both the uplink and the downlink. In some embodiments, the MME sends one or more quality of service class identifiers (QCIs) to the base station, and the base station correlates the QCIs to a service identifier which is associated with a set of configuration parameters for the plurality of bearers associated with the service.

The plurality of bearers are configured according to the configuration parameters associated with the service identifier. In this way, features such as quality of service (QoS), bandwidth, codec and bit rate are assigned to each bearer associated with a service, rather than assigning these features to a bearer without cognizance of the service to which the bearer belongs. Further, admission decisions are collectively made for the group of bearers associated with the service, rather than making uncorrelated admission decisions for each bearer individually without regard to service association. These admission decisions may be in addition to, part of, or as an alternative to the bearer configuration herein described and include establishing, modifying or releasing one or more of the bearers associated with the service.

In some embodiments, the service configuration parameters are stored in the base station, as noted. However, in some embodiments, at least some of the service configuration parameters are stored in a network node that is in communication with the base station. For example, a Home Subscriber Service (HSS) database may store service identifiers and configuration parameters for each of a plurality of bearers associated with the service. This data is sent to the MME, which forwards the data to the base station in response to a request to provide a particular service to a user equipment (UE). The data from the MME includes QCIs and may include the service identifier and the base station uses the QCIs alone or QCIs and the service identifier to configure additional parameters of bearers of the service.

In some embodiments, the QCIs alone or the QCIs and the service identifier are transmitted from the network node to the base station in a radio access bearer (RAB) message. RAB messages, such as E-RAB setup request and E-RAB modify request, carry information used to configure the radio bearer specified in the message. Thus, in some embodiments, the service identifier is included in the RAB messages for each bearer associated with the identified service.

In other embodiments, the QCIs alone or the QCIs and the service identifier is sent with an initial context setup message. In some embodiments, more generally, the QCIs alone or the QCIs and the service identifier are sent as an S1AP message on the S1 interface between the MME and the base station. Also, a handover request containing at least the service identifier, and possibly some configuration parameters as well, may be sent from a source base station to a target base station on an X2 interface as an X2AP message, to facilitate the process of handing off the UE from the source base station to the target base station.

In some embodiments, the QCIs alone or the QCIs and the service identifier are included in a message from a serving gateway to the MME on an S11 interface, from a packet data network (PDN) gateway to the serving gateway on an S5 or S8 interface, and from a policy control and charging rules function (PCRF) to the PDN gateway on a Gx interface.

In some embodiments, the message carrying the service identifier also includes rate information, such as codec bit rates, including codec maximum and minimum bit rates for one or more bearers. In other embodiments, the codec bit rates for each bearer associated with a service are stored in the base station and are identified with the service identifier at the base station. The service configuration parameters associated with a service identifier may include—for at least some of the bearers associated with the service—a codec identifier, one or more codec bit rates (including maximum and minimum codec bit rates) associated with the identified codec, a resolution and frame rate.

Referring now to the drawing figures, in which like reference numerals refer to like elements, there is shown in FIG. 1 a block diagram of one embodiment of the portion of a wireless communication system 10 useful for understanding the principles of the invention. The wireless communication system 10 includes an MME 12, a serving gateway 13, an HSS 14, a packet data network (PDN) gateway 15, a plurality of base stations 16a and 16b, referred to collectively as base stations 16, a policy control and charging rules function (PCRF) 17, at least one UE 18 and an operator's IP services 19. The operator services 19 define the various services to be provided to a subscriber, and may be an Internet Protocol Multimedia Subsystem (IMS) network. In some embodiments, the IMS network may include the PCRF 17.

The MME 12 stores one or more QCIs and/or service identifiers 20, and may also store service configuration parameters 22. In some embodiments, the QCIs and/or service identifiers 20 and service configuration parameters 22 of the MME 12 are obtained from a database 24 of the HSS 14. In some embodiments, some service configuration parameters may arrive at the MME 12 from the serving gateway 13. In some embodiments, the MME 12 only stores QCIs and/or service identifiers 20 and all service configuration parameters are stored at the base station 16.

Thus, the base stations 16 also store QCIs and service identifiers and service configuration parameters. The QCIs/service identifiers 26, 30 and service configuration parameters 28, 32 stored at the base stations 16 may be obtained from the MME 12 at a time of setup, modification, or deletion of a service, or may be pre-stored. The MME 12 communicates with the base station 16a over an S1 interface and communicates with the HSS 14 over an S6 interface. The base station 16a communicates with the UE 18 over the air interface and communicates with other base stations 16b over an interface, such as the X2 interface. Note that although the configuration of FIG. 1 is an LTE network, the inventive concepts and principles discussed herein apply to other wireless communication systems such as, for example, a Worldwide Interoperability for Microwave Access (WI-MAX) network, a Universal Mobile Telecommunications System (UMTS) network or any other network or system where connections, calls, or bearers (bidirectional or otherwise) required for a service are not managed collectively, i.e., are managed individually.

In some modes of operation, service creation is triggered in one of several ways. For example, creation of a service with associated bearers may occur when the UE 18 attaches to the network by, for example, initiating a call. During authentication of the UE 18, the MME 12 retrieves the subscriber profile from the database 24 of the HSS 14 via the S6 interface to authenticate the subscriber and determine if the subscriber is subscribed to the requested service.

Thus, when a subscriber attaches to the network, the subscriber at the UE 18 may request a particular service that requires a plurality of bearers to carry the data and signaling required to establish and maintain the service. This request may be communicated to the MME 12 via the base station 16a. The MME 12 obtains one or more QCIs alone or QCIs and a service identifier 20 for the requested service. The QCIs and/or service identifier may be pre-stored at the MME 12, obtained from the HSS 14 or from the serving gateway 13. The MME 12 sends the QCIs alone or the QCIs and the service identifier to the base station 16a.

The QCIs alone or the QCIs and the service identifier (hereafter, QCIs/service identifier) may be communicated to the base station 16a via an E-RAB setup message or an E-RAB modify message. For example, the QCIs/service identifier may be included in the E-RAB level QoS parameters information element of the E-RAB setup message for the E-RAB to be setup. Similarly, the QCIs/service identifier may be included in the E-RAB level QoS parameters information element of the E-RAB modify message for the E-RAB to be modified. When the RAB messages are used to communicate the QCIs/service identifier, optional parameters may also be included. These optional parameters are specific to the particular service and may, for example, include codec information. As an alternative to using RAB messages to communicate the QCIs/service identifier, the QCIs/service identifier may be sent in an S1AP message. For this purpose, two new S1AP messages may be introduced: E-Service Setup and E-Service Modify. Each of these messages include service configuration parameters for a plurality of bearers associated with the service. Thus, in one embodiment, an RAB is sent for each bearer associated with a service, and in another embodiment, a single message includes service configuration parameters for all of the bearers supporting the service.

In some modes of operation, the UE 18 may already be attached to the network and may request, modify or terminate a service. If the service is Internet protocol multimedia subsystem (IMS)-based, an IMS node (which may include the PCRF 17) may trigger service creation or modification. As is known by those of ordinary skill in the art, the IMS is a network that supports service management such as support for creation, deletion and modification of a service.

When a service is created, the policy control and charging rules function (PCRF) 17 transmits QCIs/service identifier on the Gx interface to the packet data network (PDN) gateway 15. The PDN gateway 15 forwards the QCIs/service identifier to the serving gateway 13 on the S5 interface. The serving gateway 13 forwards the QCIs/service identifier to the MME 12 via the S11 interface. The MME 12 then forwards the QCIs/service identifier to the base station 16a on the S1 interface. In addition to the service identifier, service configuration parameters are also transmitted from the PCRF 17 to the base station 16a via of the PDN gateway 15 and the serving gateway 13.

In some modes of operation, a deep packet inspection (DPI) node can be used to monitor traffic for a UE 18. When the DPI node sees a new service requested, e.g., a session initiation protocol (SIP) INVITE message to start a VoIP session, the DPI node creates the request and signals the request to the MME. The DPI node may use the same messages as IMS nodes. The DPI node may be a logical node collocated with the PDN gateway 15 or be a physical node between the PDN gateway 15 and the Internet. The DPI node intercepts packets from or to the PDN gateway 15 to determine if a new service is being initiated. For example, when the DPI node detects that a new session, such as VoIP, is being initiated, the DPI node triggers creation of the bearers for the call by signaling the information contained in Table 1 to the MME 12.

As noted, in some embodiments, a service identifier is sent from the MME 12 to the base station 16, which correlates the service identifier to service configuration parameters. Table 1 shows the contents of an exemplary QoS message or information element (IE) used to convey the service identifier from one of the PCRF 17, PDN gateway 15, the serving gateway 13 or the MME, ultimately destined for the base station 16. A QCI is contained in Octet 6 and is omitted in some embodiments. Octets 27-28 include the service identifier and octets 29-44 contain service configuration parameters for the bearer. Octets 33-36 contain the resolution of a service if applicable, octets 37-40 contain the frame rate of a service if applicable and octets 41-56 contain the bit rate parameters for the bearer. Note that the term service identifier and service profile identifier are used interchangeably herein. Note that in some embodiments, the service identifier is sent without any service configuration parameters. In these embodiments, the base station relies on a table stored at the base station that correlates the service identifier with the service configuration parameters sufficient to configure all the bearers in support of the service.

TABLE 1

| Octets | Bits | | | | | | |
|---|---|---|---|---|---|---|---|
| | 8 | 7 | 6 | 5 | 4 | 3 | 2 | 1 |
| 1 | Type = 80 (decimal) | | | | | | |
| 2-3 | Length = n | | | | | | |
| 4 | Spare | | | | | Instance | |
| 5 | Spare | PCI | | PL | | Spare | PVI |
| 6 | Label (QCI) | | | | | | |
| 7-11 | Maximum bit rate for uplink | | | | | | |
| 12-16 | Maximum bit rate for downlink | | | | | | |
| 17-21 | Guaranteed bit rate for uplink | | | | | | |
| 22-26 | Guaranteed bit rate for downlink | | | | | | |
| 27-28 | Service Profile Identifier | | | | | | |
| 29-30 | Codec Identifier for uplink | | | | | | |
| 31-32 | Codec Identifier for downlink | | | | | | |
| 33-34 | Resolution for uplink | | | | | | |
| 35-36 | Resolution for downlink | | | | | | |
| 37-38 | FrameRate for uplink | | | | | | |
| 39-40 | FrameRate for downlink | | | | | | |
| 41-44 | Minimum bit rate for uplink | | | | | | |
| 45-48 | Minimum bit rate for downlink | | | | | | |
| 49-52 | Codec Bit Rate List for uplink | | | | | | |
| 53-56 | Codec Bit Rate List for downlink | | | | | | |
| 57 to (n + 4) | These octet(s) is/are present only if explicitly specified | | | | | | |

The bearer QoS message of Table 1 may be included in: a create bearer request message, an update bearer request message, a create session request message, a create session response message, a forward relocation request message, a context response message, a multimedia broadcast and multicast service (MBMS) session start request message and an MBMS session update request message.

Table 2 is an alternative example of information communicated in a message that carries a service identifier from the MME 12 to the base station 16a.

TABLE 2

| IE/Group Name | Presence | Range | IE type and reference | Semantics description |
|---|---|---|---|---|
| Service Level Parameters | | | | |
| Service Profile Identifier | M | | INTEGER (0 . . . 65535) | This parameter identifies the service so that nodes can expand it into or retrieve a set of service level parameters. |
| Service level AMBR | O | | | This IE applies to non-GBR bearers only and shall be ignored otherwise. |
| E-RAB IE list | M | | | This IE identifies the list of E-RAB associated to the service. |

In the examples discussed herein, the "M" indicates that the field is mandatory, whereas the "O" indicates that the field is optional. AMBR is the aggregated maximum bit rate and GBR is the guaranteed bit rate. IE refers to an information element. In this embodiment, the service identifier is sent with an indicator (E-RAB IE list) that identifies the list of radio access bearers associated with the service. When the service identifier is received by the base station 16a, the base station 16a maps the service identifier to a set of service configuration parameters that are applied to the identified bearers. These bearers are pre-associated with the service, or associated with the service at the time of configuring the bearers.

For example, the service identifier 26 may identify a VoIP service, and the service configuration parameters 28 may specify, inter alia, a type of codec and codec bit rates for each bearer supporting the service. For a video service, the service configuration parameters may specify a video resolution, a frame rate and codec. These service configuration parameters 28 configure the plurality of bearers associated with the service identified by the service identifier 26. Some of the service configuration parameters may apply to all bearers, i.e., to the service as a whole, while other service configuration parameters apply to a specific one of the bearers. Note also that configuration of a service may include implementing admission control, including establishing, modifying or releasing a particular one of a plurality of bearers associated with the identified service. The service configuration may also include bit rate adaptation of some or all of the bearers. Further, service configuration may include configuration at the time the service is set up or refer to service that is modified post set up.

In the case of handover of the UE from the base station 16a to the base station 16b, at least a service level identifier 26 is sent from the base station 16a to the base station 16b on the X2 interface. The service level identifier 26 may be contained in an E-RAB Level QoS parameter information element. Upon receiving the service level identifier, the base station 16b retrieves corresponding service configuration parameters 32 to configure the bearers associated with the service identifier. The service configuration parameters applied to the bearers at the target base station 16b may be received from the source base station 16a or may be stored in the base station 16b and associated with the service identifier from the source base station 16a. In some embodiments, service configuration parameters received from the source base station 16a supersede the service configuration parameters stored in the target base station 16b.

Some of the services that may be associated with a set of configuration parameters include voice over long term evolution (VoLTE) service, an Internet Protocol Multimedia Subsystem (IMS) video service, a voice over Internet (VoIP) best effort service, and a video best effort service.

In connection with the provision of these services, different types of codecs may be specified, including an adaptive multi-rate (AMR) codec, a video Motion Picture Experts Group (MPEG) codec at a specified frame rate and an audio codec.

Table 3 is another example of a message that may be sent from the MME 12 to the base station 16. The message optionally includes a service identifier which is used to retrieve the service configuration parameters stored at the base station. The message also includes a rate information field that provides bearer level information related to rates supported.

TABLE 3

| IE/Group Name | Presence | Range | IE type and reference | Semantics description | Criticality | Assigned Criticality |
|---|---|---|---|---|---|---|
| QCI | M | | INTEGER (0 . . . 255) | QoS Class Identifier defined in TS 23.401. Logical range and coding specified in TS 23.203. | — | — |
| Allocation and Retention Priority | M | | 3GPP TS 36.413 9.2.31 | | — | — |
| GBR QoS Information | O | | 3GPP TS 36.413 9.2.10 | This IE applies to GBR bearers only and shall be ignored otherwise. | — | — |
| Service Identifier | O | | INTEGER (0 . . . 65535) New | This identifier is used to retrieve the service specific configuration in the eNB. | — | — |
| Rate Information | O | | New | This IE provides bearer level information related to rates supported. | — | — |

Table 4 shows rate information that may be identified by the rate information field of the message of Table 3.

TABLE 4

| IE/Group Name | Presence | Range | IE type and reference | Semantics description |
|---|---|---|---|---|
| e-RAB-CodecDL | M | | New | Downlink supported codec and bit rate list |
| e-RAB-ResolutionDL | O | | New | Resolution that downlink bearer will use. |
| e-RAB-MinimumBitrateDL | O | | BitRate New | Downlink initial/preferred bit rate in kbps (remote to local). Note that the GBR parameter can be used as target bit rate when this parameter is omitted. |

TABLE 4-continued

| IE/Group Name | Presence | Range | IE type and reference | Semantics description |
|---|---|---|---|---|
| e-RAB-MaximumBitrateDL | O | | BitRate New | Downlink initial/preferred bit rate in kbps (remote to local). Note that the GBR parameter can be used as target bit rate when this parameter is omitted. |
| e-RAB-FrameRateDL | O | | New | The frames per second transmitted in the downlink direction. |
| e-RAB-CodecUL | M | | New | Uplink supported codec and bit rate list |
| e-RAB-ResolutionUL | O | | New | Resolution that uplink bearer will use. |
| e-RAB-MinimumBitrateUL | O | | BitRate New | Uplink initial/preferred bit rate in kbps (remote to local). |
| e-RAB-MaximumBitrateUL | O | | BitRate New | Uplink initial/preferred bit rate in kbps (remote to local). |
| e-RAB-FrameRateUL | O | | New | The frames per second transmitted in the uplink direction. |

Numerical references such as 9.2.31 refer to passages in 3GPP communication standard TS 36.413.

Table 4 specifies a supported codec identifier, and bearer resolutions, frame rate and bit rates, for an uplink bearer and a downlink bearer associated with the service identified by the service identifier of Tables 1, 2 or 3. In some embodiments, these parameters are transferred from the MME 12 to the base station 16*a*. In other embodiments, these parameters are pre-stored in the base station 16 and associated with a service profile.

In one embodiment, the service profile or service identifier is an unsigned 32 bit field which indicates the service to which the specific information refers. More specifically, the service identifier identifies the service to which a plurality of bearers belong, and is used by the base station to retrieve the service configuration parameters for configuring the associated bearers. In one embodiment, the service identifier originates at the PCRF 17 and is transmitted to the PDN 15 via the Gx interface. In one embodiment, the PDN 15 forwards the service identifier to the serving gateway 13 via the S5 interface. In one embodiment, the serving gateway 13 forwards the service identifier to the MME 12 via the S11 interface.

The service identifier groups one or more bearers into an application level service such as VoLTE or video service. The service configuration parameters may include the parameters indicated in Table 4, and may include additional parameters. For example, service configuration parameters may include bit rate information which is of the type "Grouped". Each type contains the bit rate associated with one direction of one service bearer within one application level service. Thus, the service configuration parameters may include a bitrate information-UL message that specifies a codec, a codec bitrate list, a resolution, a code frame rate, a codec minimum bit rate and a codec maximum bit rate, all for an uplink bearer. Similar information is provided for a downlink bearer. These parameters may be sent in the same message or in different messages.

The service configuration parameters may include a codec identifier value that applies to services that use a codec, such as, for example, adaptive multi rate (AMR), sound or video. The service configuration parameters may include a codec bit rate list that applies to services that support multiple bit rates, such as, for example, video or voice services. The bit rate list may include a type unsigned32 data value for each bit rate in the list. The service configuration parameters may include a resolution that applies to service that use a resolution, such as a video service.

The service configuration parameters may include a codec minimum bit rate that specifies the minimum bit rate to be allowed for the associated service data flow. In one embodiment, the codec minimum bit rate is of a type "unsigned32" and indicates the minimum bit rate in bits per second for a service data flow. The bandwidth contains all the overhead coming from the IP-layer and the layers above, e.g., IP, UDP, RTP and RTP payload. The service configuration parameters may also include a codec maximum bit rate that specifies the maximum bit rate to be allowed for the associated service data flow. In one embodiment, the codec maximum bit rate is of type "unsigned32", and indicates the maximum bit rate in bits per second for a service data flow. The bandwidth contains all the overhead coming from the IP-layer and the layers above, e.g., IP, UDP, RTP and RTP payload.

The service configuration parameters may also include a codec bit rate that specifies a bit rate supported by the codec. Multiple instances are required to specify multiple bit rates supported. In one embodiment, the codec bit rate is of type "unsigned32", and indicates a bit rate in bits per second for a service data flow. The bandwidth contains all the overhead coming from the IP-layer and the layers above, e.g., IP, UDP, RTP and RTP payload. The service configuration parameters may also include a maximum number of supported codec bit rates, a codec bit rate ID, and resolution ID.

Thus, in some embodiments, the base station receives a service identifier in a message that includes a rate information indicator that refers the base station 16 to a table of service configuration parameters to be implemented for each bearer so that the bearers associated with a service can be treated as a group. At least some of these service configuration parameters may be included in information elements transmitted from the MME 12 to the base station 12. Examples of these information elements are as follows:

| IE/Group Name | Presence | Range | IE Type and Reference | Semantics Description | Criticality |
|---|---|---|---|---|---|
| Codec Info Item | | 1 ... <maxnoofCodecItems> | | | EACH |
| >codecIdentifier | M | | New | — | |
| >codecBitRateList | M | | New | — | |

| Range bound | Explanation |
|---|---|
| maxnoofCodecItems | Maximum no. of Codec Bit Rate supported for the given Codec, the maximum value is 16. |

| IE/Group Name | Presence | Range | IE Type and Reference | Semantics Description |
|---|---|---|---|---|
| Codec Identifier | M | | ENUMERATED (AMR, VideoMPEG-4-SP at 30 fps, VideoMPEG-4-ASP at 30 fps, Sound-H.264,) | |

| IE/Group Name | Presence | Range | IE Type and Reference | Semantics Description |
|---|---|---|---|---|
| Codec Bit Rate Info | | | | |
| >Codec Bit Rate ID | M | | New | |
| >Codec Bit Rate | M | | BitRate, New | |

| IE/Group Name | Presence | Range | IE Type and Reference | Semantics Description |
|---|---|---|---|---|
| Codec Bit Rate ID | M | | OCTET STRING | |

| IE/Group Name | Presence | Range | IE Type and Reference | Semantics Description |
|---|---|---|---|---|
| Resolution ID | M | | INTEGER(0 ... 65535) | |

| IE/Group Name | Presence | Range | IE type and reference | Semantics description |
|---|---|---|---|---|
| FrameRate | M | | INTEGER(0 ... 512) | |

In some embodiments, rather than transmit a service identifier 20 to the base station 16a, a plurality of QoS class identifiers (QCIs), each associated with a different bearer associated with the service, are sent from the MME to the base station 16a. In this case, the base station 16 can use the QCIs to determine the set of service configuration parameters 28. For example, each QCI may be sent via a different one of a plurality of RAB messages, each RAB message pertaining to a particular one of the plurality of bearers of the service. The base station 16a determines a service identifier 26 based on the received QCIs from a table stored at the base station 16a. The determined service identifier 26 identifies a requested service and is associated with a set of service configuration parameters 28. Table 5 is an example of a table stored in the base station 16 that associates the received QCIs with a service identifier. The description refers to whether the QCI is associated with a communication standard or is available for operator-specified use. The priority field is an existing field in accordance with the embodiment of Table 5. As is shown, it is contemplated that other fields can be incorporated into Table 5.

TABLE 5

| QCI ID | Description | Priority | ... | Service-profile-ID | ... |
|---|---|---|---|---|---|
| 1 | Standardized | Existing field | | ID in range [0 ... 65535] | |
| ... | Standardized | Existing field | | ID in range [0 ... 65535] | |
| 9 | Standardized | Existing field | | ID in range [0 ... 65535] | |
| 10 | Operator's | Existing field | | ID in range [0 ... 65535] | |
| ... | Operator's | Existing field | | ID in range [0 ... 65535] | |
| 255 | Operator's | Existing field | | ID in range [0 ... 65535] | |

Table 6 provides an exemplary description of services identified by the service identifier and bearer profile identifiers for each service. It is understood that service profile IDs can be associated with any manner of bearer profile IDs. In Table 6, "Bearer correlated" indicates whether two or more bearers depend one from another, such that removing one would cause removal of the other.

TABLE 6

| Service profile ID | Description | Bearer Correlated | Bearer Profile ID (BPID) |
|---|---|---|---|
| 0 | Default | | |
| 1 | VoLTE-Service | No<br>Yes | Voice = BPID 1<br>Signal = BPID 2 |
| 2 | IMS Video service | Yes, to sound<br>Yes, to sound<br>Yes, to video<br>Yes, to video<br>Yes, to all | DL Video = BPID 3<br>UL Video = BPID 3<br>DL Sound = BPID 5<br>UL Sound = BPID 5<br>Signal = BPID 6 |
| 3 | VoIP over Best Effort | No<br>Yes | Voice = BPID 7<br>Signal = BPID 8 |
| 4 | Video over Best Effort | Yes, with sound<br>Yes, with video<br>Yes, with all. | Video = BPID 9<br>Sound = BPID 10<br>Signal = BPID 11 |
| ... | | | |
| 255 | | | |
| ... | | | |
| 65535 | | | |

Each bearer profile identifier may be associated with one or more codecs and bitrates to be applied to bearers associated with the service, as shown in the examples provided in Table 7.

TABLE 7

| Bearer Profile ID | Desc. | Codec and bit rate (in kbps) | | Target bit rate | Inter-packet period |
|---|---|---|---|---|---|
| 0 | Default | | | | |
| 1 | AMR | AMR_12.20 | 12.2 | 12.20 | 20 ms, |
|   |     | AMR_10.20 | 10.2 |       | 160 ms |
|   |     | AMR_7.95  | 7.95 |       | for SID |
|   |     | AMR_7.40  | 7.40 |       |        |
|   |     | AMR_6.70  | 6.70 |       |        |
|   |     | AMR_5.90  | 5.90 |       |        |
|   |     | AMR_5.15  | 5.15 |       |        |
|   |     | AMR_4.75  | 4.75 |       |        |
|   |     | AMR_SID   | 1.80 |       |        |
| 2 | IMS | | | | |

| | | | Max buffer | rate | Max packet size | |
|---|---|---|---|---|---|---|
| 3 | Signal | L3 | 640 | 384 | CIF 352 × 288 | |
|   | Video  | L2 | 640 | 128 | 256 × 192 | |
|   | MPEG-  | L1 | 160 | 64  | 128 × 92 | |
|   | 4-SP   | L0b | 320 | 128 | | |
|   | at 30 fps | L0 | 160 | 64 | | |

| | | | Max buffer | rate | Max pkt size | |
|---|---|---|---|---|---|---|
| 4 | Video | L5 | 1792 | 8000 | 720 × 576 | |
|   | MPEG- | L4 | 1280 | 3000 | 352 × 576 | |
|   | 4-ASP |    |      |      | 704 × 288 | |
|   | at 30 fps | L3b | 1040 | 1500 | CIF 352 × 288 | |
|   |           | L3  | 640  | 768  | CIF 352 × 288 | |
|   |           | L2  | 640  | 384  | 256 × 192 | |
|   |           | L1  | 160  | 128  | QCIF 176 × 144 | |
|   |           | L0  | 160  | 128  | QCIF 176 × 144 | |
| 5 | Sound H.264 | Bit rates are codec specific Example: H.264 encoding at 64 kbits/sec | | | | Example: 33 ms |
| 8 | Video-signal | Example: 0.5, 2, 4 | | | | |
| ... | | | | | | |
| 255 | | | | | | |
| ... | | | | | | |

Thus, a service identifier may specify a bearer profile for each bearer associated with the service, and the bearer profile may specify a codec to be applied to the bearer.

In some embodiments, one or more QCIs are received at the base station 16 from the MME 12 via a variety of different types of messages such as RAB messages, and are correlated to determine a service identifier. Each QCI is associated with a particular bearer, or one QCI is associated with the service as a whole. When the one or more QCIs are received at the base station, the base station correlates the QCIs with a service identifier, as from Table 5. The service identifier identifies a service and is associated with a bearer profile in Table 6, which is correlated by the base station 16 with a codec and bit rates in Table 7.

Thus, in some embodiments, the service identifier, rather than the QCI, is received at the base station 16 from the MME 12 in a message such as shown in Tables 1, 2 or 3. The base station 16 correlates the received service identifier with the service configuration parameters of which some are included in Table 4. In other embodiments, at least one QCI is received at the base station 16 from the MME 12. The base station 16 correlates the received at least one QCI with a service identifier as in Table 5. The service identifier is correlated with a bearer profile in Table 6 and the bearer profile is correlated to a codec and bit rates in Table 7.

Figure 2:
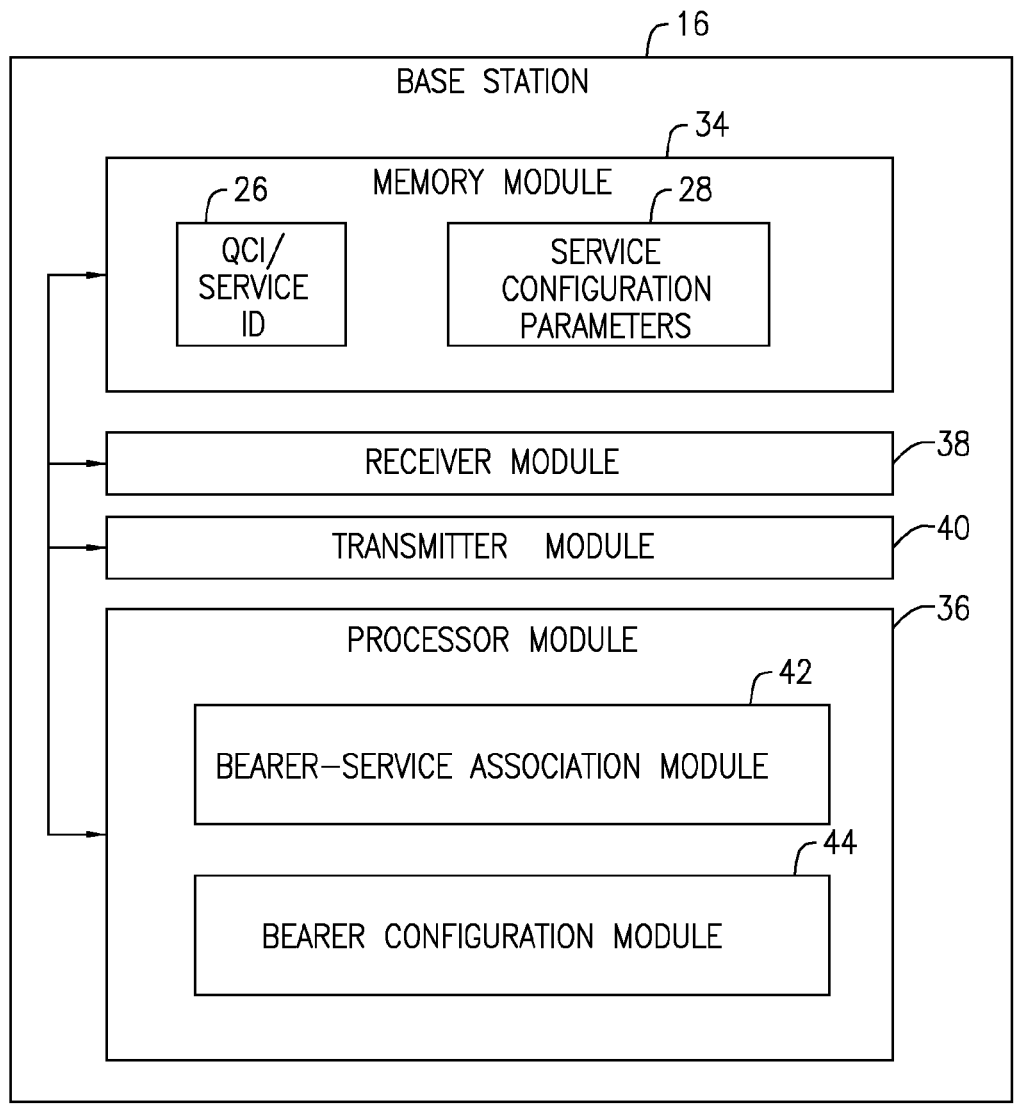
FIG. 2 is a block diagram of one embodiment of a base station constructed in accordance with principles of the present invention.

Returning now to the drawing figures, FIG. 2 is a block diagram of one embodiment of a base station 16. The base station 16 has a memory module 34, a processor module 36, a receiver module 38 and a transmitter module 40. Although shown and described as modules, elements 34, 36, 38 and 40 may be implemented as a memory, processor, receiver and transmitter, respectively. Alternatively, processing means which include a processor and a memory may be used by the base station 16. The memory module 34 stores QCIs and service identifiers 26, and service configuration parameters 28. The processor module 36 has a bearer-service association module 42 that identifies bearers associated with a service identifier received from a network node. The processor module 36 also has a bearer configuration module 44 that configures the bearers associated with the identified service. In one embodiment, the processor module 36 can be implemented as a microprocessor operating under the direction of software instructions, or may be an application specific integrated circuit, for example. Thus, the bearer-service association module 42 and the bearer configuration module 44 may provide functions that are implemented by a mix of hardware and software modules. The receiver module 38 receives the service identifier and/or a QCI from the network node, such as the MME 12. The transmitter module 40 may transmit a service request to the network node, so that the network node can select a service identifier corresponding to the requested service.

Figure 3:
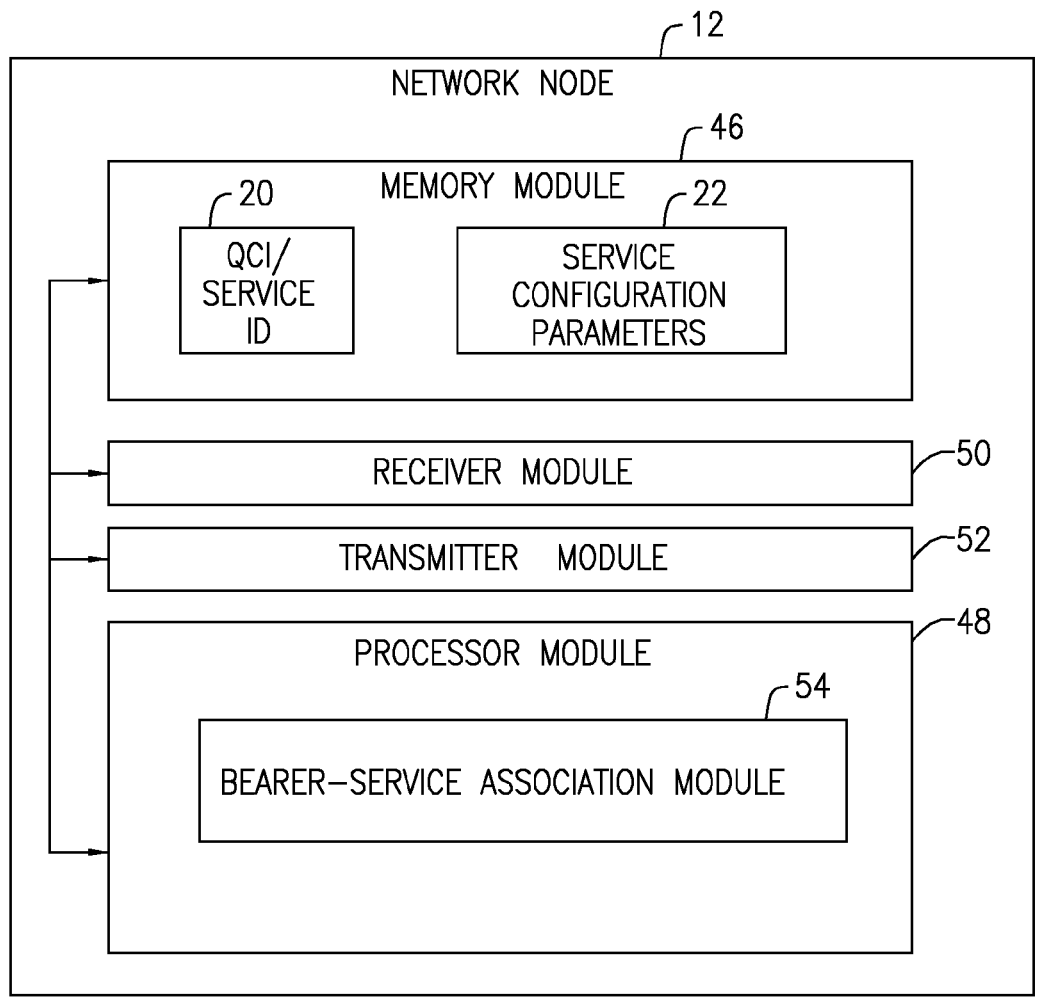
FIG. 3 is a block diagram of one embodiment of a network node constructed in accordance with principles of the present invention.

FIG. 3 is a block diagram of one embodiment of a network node 12. The network node 12 has a memory module 46, a processor module 48, a receiver module 50 and a transmitter module 52. As with the base station, elements 46, 48, 50 and 52 may be implemented as a memory, processor, receiver and transmitter, respectively. The memory module 46 stores QCIs and/or service identifiers 20. In some embodiments, the memory module 46 also stores service configuration parameters 22. In these embodiments, the processor module 48 has a bearer-service association module 54 that associates bearers with an identified service. In one embodiment, the processor module 48 can be implemented as a microprocessor operating under the direction of software instructions, or may be an application specific integrated circuit, for example. Thus, the bearer-service association module 54 may provide functions that are implemented by a mix of hardware and software modules. Once the bearers associated with the service are identified, the service configuration parameters 22 for each bearer may be transmitted to the base station 16 along with the service identifier and/or the QCIs associated with the bearers.

Figure 4:
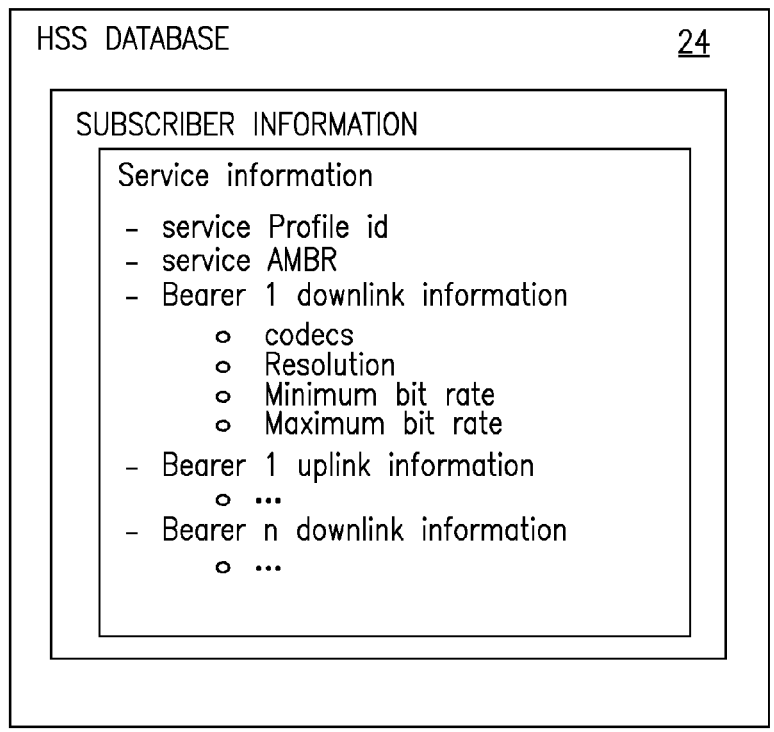
FIG. 4 is a block diagram of an HSS database constructed in accordance with principles of the present invention.

In some embodiments, the service identifiers/QCIs 20 and the service configuration parameters 22 are obtained from the database 24 of the HSS 14 or from the serving gateway 13. The database 24 organizes the different services for each of a plurality of subscribers according to service identifiers and bearers, as shown in FIG. 4, where AMBR is an aggregated maximum bit rate. Thus, the database 24 may specify what services are provided to each subscriber of multiple subscribers, and may specify the parameters for each service for each subscriber.

Figure 5:
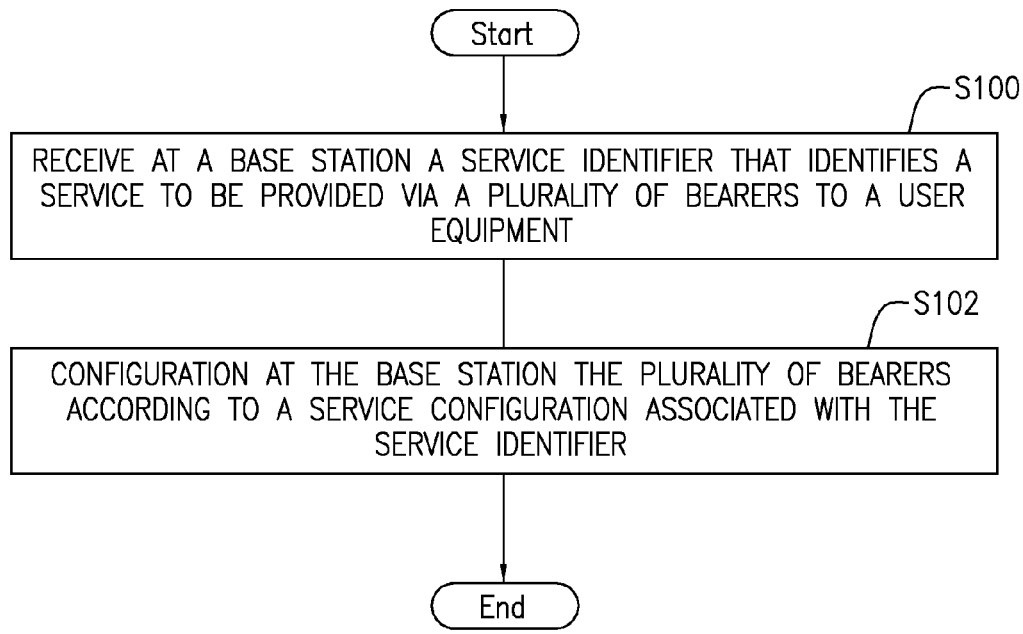
FIG. 5 is a flowchart of an exemplary process for configuring bearers associated with a service.

FIG. 5 is a flowchart of an exemplary process for configuring bearers associated with a service. A base station 16 receives a service identifier that identifies a service to be provided via a plurality of bearers to a UE 18 (block S100). The service identifier may be carried in a RAB message or separate S1AP message, for example, and may include the information one of Tables 1, 2 or 3. The base station 16 configures the plurality of bearers according to a service configuration associated with the service identifier (block S102). Details of the service configuration may be found in Table 4. For example, the base station 16 may adapt a bit rate for one or more voice bearers, or adjust a video resolution and frame rate for a video bearer.

In some embodiments, all of the service configuration parameters are stored at the base station, and the base station receives only a service identifier from a network node to identify the service to be established, modified or deleted. In some embodiments, some but not all of the service configuration parameters associated with a service identifier are received by the base station from a network node. In some embodiments, the service configuration parameters stored in the base station override the service configuration parameters received from a network node. In other embodiments, the service configuration parameters received from the network node override the service configuration parameters stored at the base station. Note further that in some embodiments, a service-wide configuration parameter, i.e., one that applies to all bearers supporting the service, may take precedence over a conflicting bearer-specific configuration parameter. In other embodiments, the opposite case exists, where a bearer-specific configuration parameter may supersede a service-wide configuration parameter.

Figure 6:
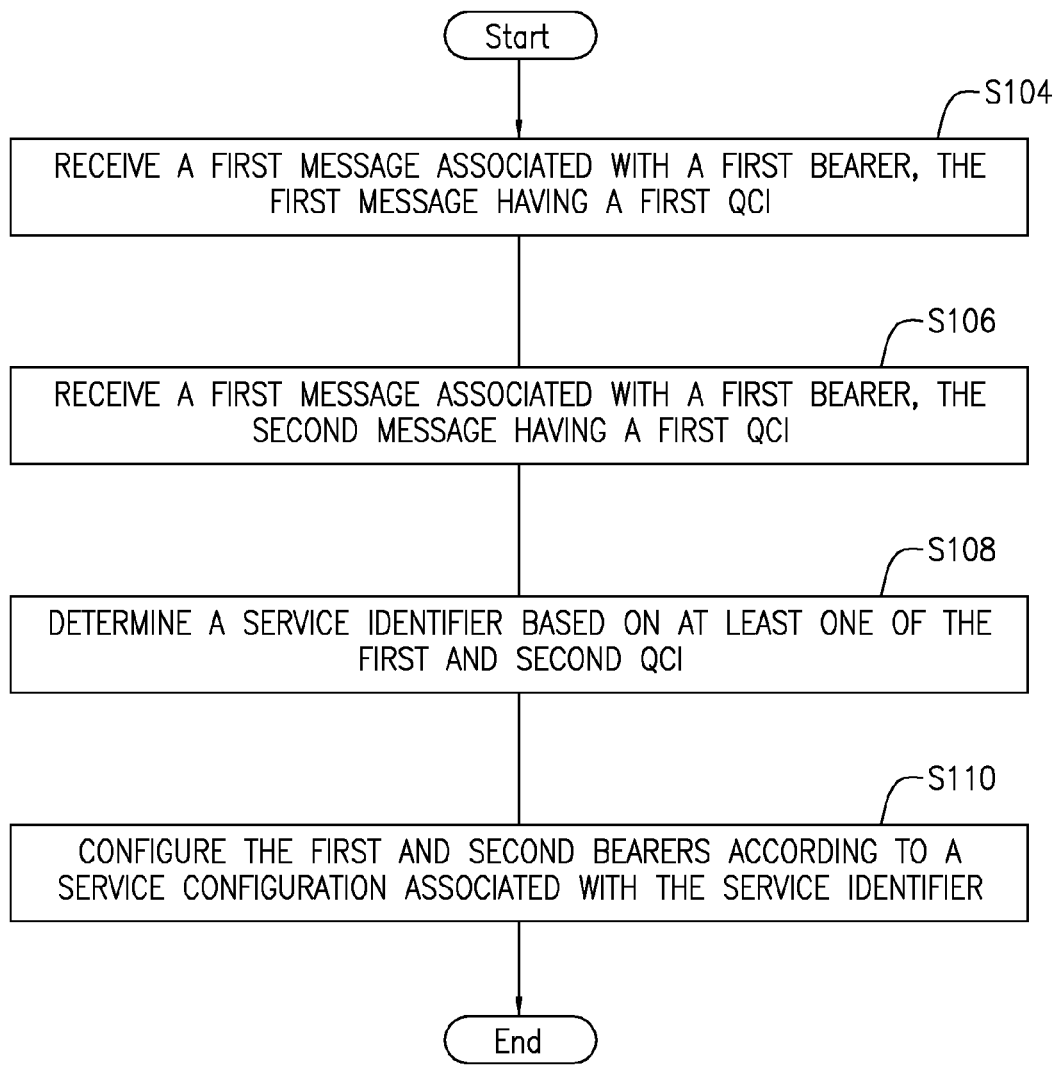
FIG. 6 is flowchart of another exemplary process for configuring bearers associated with a service.

FIG. 6 is a flowchart of another exemplary process for configuring bearers associated with a service. A first message is received at the base station 16 that is associated with a first bearer and has a first QCI (block S104). A second message is received at the base station 16 that is associated with a second bearer and has a second QCI (block S106). A service identifier is determined based on at least one of the first and second QCIs (block S108) as in Table 5. The first and second bearers are configured according to a service configuration associated with the determined service identifier (block S110) as in Tables 6 and 7. Note that the first and second messages are RAB messages in some embodiments. Also, note that the service configuration may include a service-wide configuration that applies to all bearers supporting the service, and/or may include bearer-specific configurations that apply only to particular bearers.

Embodiments described herein enable the base station 16 to perform admission control, congestion and rate adaptation with respect to a service, rather than at a per bearer level. For example, when congestion is detected at the base station 16, rate adaptation algorithms may be chosen to adapt the rates of multiple bearers associated with the service. For example, an IMS video service may use a signaling bearer, a voice bearer and a data bearer. To address congestion, a service level rate adaptation algorithm could consider rate adaptation for all three bearers.

In conventional systems applying admission decisions at the bearer level only, one bearer used to support a service may be admitted, while other bearers needed to support the service may not be admitted. This wastes resources since the service is not useable. By basing admission on service level information, admitting all bearers that support the service is possible. For example, a video service may have 3 bearers (voice, data, control signaling). When admitting a video service, based on the service identifier, the number of bearers associated with the service is known. Hence, resources can be reserved for all three bearers. Similarly, preemption can be performed at the service level, rather than at the bearer level. Service level rate adaptation, admission and preemption improve resource utilization and increase end user satisfaction.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings, which is limited only by the following claims.

What is claimed is:

1. A method of configuring a service at a base station of a wireless communication network, the method comprising:
   receiving at the base station from a network node, a service identifier that identifies a service to be provided via a plurality of bearers to a user equipment; and
   configuring at the base station the plurality of bearers according to a service configuration associated with the service identifier.

2. The method of claim 1, wherein receiving comprises receiving a plurality of Radio Access Bearer, RAB, messages, each RAB message being associated with a respective one of the plurality of bearers and including the service identifier.

3. The method of claim 2, wherein each of the plurality of RAB messages is one of an E-RAB Setup message, an E-RAB Modify message and an Initial Context Setup message.

4. The method of claim 1, wherein the received service identifier is received in an S1AP message having a plurality of bearers associated with the service identifier, the S1AP message being one of an E-Service Setup message, an E-Service Modify message and an E-Service Release message.

5. The method of claim 1, further comprising receiving the service configuration from the network node.

6. The method of claim 1, wherein the service configuration is stored at the base station.

7. The method of claim 1, further comprising at least one of establishing, modifying and releasing one of the plurality of bearers.

8. The method of claim 1, further comprising adapting a bit rate for each of the plurality of bearers.

9. The method of claim 1, wherein the service configuration comprises one of at least one service configuration parameter and at least one bearer configuration parameter for each of the plurality of bearers.

10. The method of claim 9, wherein a least one bearer configuration parameter comprises one of a video resolution, a frame rate and a codec.

11. The method of claim 10, wherein the codec is one of an adaptive multi-rate codec, a video Motion Picture Experts Group (MPEG) codec at a specified frame rate and an audio codec.

12. The method of claim 1, wherein the service is one of a voice over long term evolution (VoLTE) service, an Internet Protocol Multimedia Subsystem (IMS) video service, a voice over Internet (VoIP) best effort service, and a video best effort service.

13. The method of claim 1, wherein the network node is a mobile management entity, MME.

14. A base station, comprising:
   a receiver configured to receive a service identifier that identifies a service to be provided to a user equipment, UE;
   a memory configured to store the received service identifier; and
   a processor in communication with the memory and configured to:
      associate a plurality of bearers with the identified service; and
      configure the plurality of bearers according to the identified service.

15. The base station of claim 14, wherein the configuration of the plurality of bearers specifies, for each bearer, at least one of a video resolution, a frame rate and a codec.

16. The base station of claim 14, wherein the service identifier is received in a radio access bearer, RAB, message associated with one of the plurality of bearers.

17. The base station of claim 14, wherein the service identifier is received in an S1AP message.

18. A method of configuring a service at a base station of a wireless communication network, the method comprising:
   receiving a first message associated with a first bearer, the first message containing a first quality of service class identifier, QCI;
   receiving a second message associated with a second bearer, the second message containing a second quality of service class identifier, QCI;
   determining a service identifier based on at least one of the first and second QCIs; and
   configuring at the base station the first and second bearers according to a service configuration associated with the service identifier.

19. The method of claim 18, wherein the service configuration is stored at the base station.

20. The method of claim 18, further comprising at least one of establishing, modifying and releasing one of the first and second bearers.

21. The method of claim 18, further comprising adapting a bit rate for each of the first and second bearers.

22. The method of claim 18, wherein the service configuration comprises one of at least one service configuration parameter and at least one bearer configuration parameter for each of the plurality of bearers.

23. The method of claim 22, wherein the at least one bearer configuration parameter comprises one of a video resolution, a frame rate and a codec.

24. A base station, comprising:
   a receiver configured to receive a request for one of a plurality of services and at least one quality of service class identifier, QCI, corresponding to the requested service;
   a memory configured to store:
      a table mapping QCIs to corresponding service identifiers; and
      service configuration parameters; and
   a processor in communication with the memory and configured to:
      determine a service identifier using the at least one received QCI; and
      identify a set of service configuration parameters associated with the service identifier; and
      configure a plurality of bearers according to the service configuration parameters associated with the service identifier.

25. The base station of claim 24, wherein the set of service configuration parameters are associated with a plurality of bearers, the configuration parameters identifying at least one of a video resolution, a frame rate and a codec for each of the plurality of bearers.

26. A base station, comprising:
   a receiver module configured to receive a service identifier that identifies a service to be provided to a user equipment, UE;
   a memory module configured to store the received service identifier; and
   a processor module in communication with the memory module and configured to:
      associate a plurality of bearers with the identified service; and
      configure the plurality of bearers according to the identified service.

27. A base station, comprising:
a receiver module configured to receive a request for one of a plurality of services and at least one quality of service class identifier, QCI, corresponding to the requested service;
a memory module configured to store:
  a table mapping QCIs to corresponding service identifiers; and
  service configuration parameters; and
a processor module in communication with the memory module and configured to:
  determine a service identifier using the at least one received QCI;
  identify a set of service configuration parameters associated with the service identifier; and
  configure a plurality of bearers according to the service configuration parameters associated with the service identifier.

\* \* \* \* \*

UNITED STATES PATENT AND TRADEMARK OFFICE
CERTIFICATE OF CORRECTION

| | |
|---|---|
| PATENT NO. | : 9,444,679 B2 |
| APPLICATION NO. | : 14/368905 |
| DATED | : September 13, 2016 |
| INVENTOR(S) | : Cabrera et al. |

It is certified that error appears in the above-identified patent and that said Letters Patent is hereby corrected as shown below:

On the Title Page

On Page 2, Item (56) under "OTHER PUBLICATIONS", in Column 2, Line 10, delete "consisiting" and insert -- consisting --, therefor.

In the Specification

In Column 2, Line 21, delete "a least" and insert -- at least --, therefor.

In Column 2, Line 29, delete "Internet" and insert -- Internet Protocol --, therefor.

In Column 4, Line 63, delete "Service" and insert -- Server --, therefor.

In Column 10, Line 16, delete "Internet" and insert -- Internet Protocol --, therefor.

In Column 12, Line 66, delete "base station 12." and insert -- base station 16. --, therefor.

In the Claims

In Column 19, Line 39, in Claim 10, delete "a least" and insert -- at least --, therefor.

In Column 19, Line 49, in Claim 12, delete "Internet" and insert -- Internet Protocol --, therefor.

Signed and Sealed this
Seventh Day of March, 2017

Michelle K. Lee
*Director of the United States Patent and Trademark Office*